July 3, 1934.  J. T. LOVETT, JR  1,964,887
RESILIENT SEAL PLANT BALL PACKAGE
Filed Aug. 27, 1932
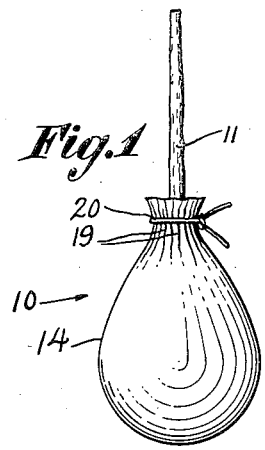
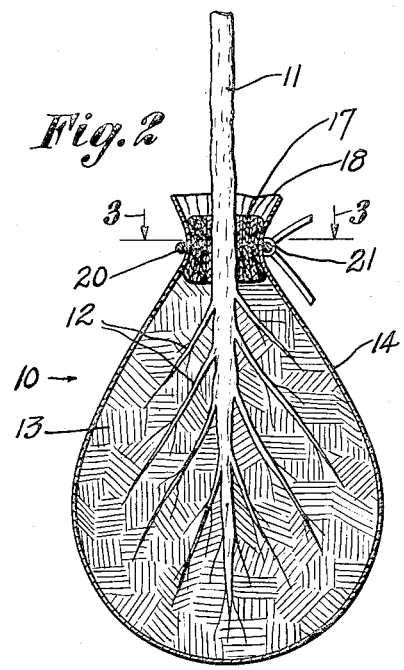
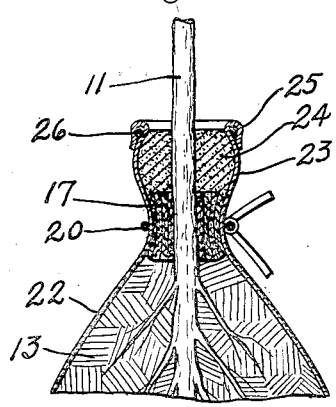
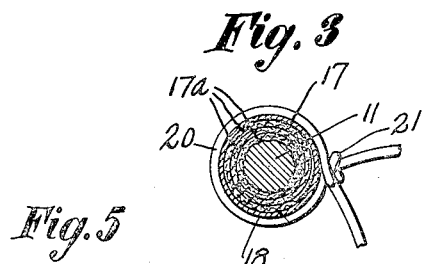
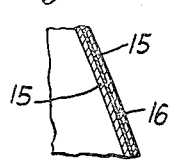
INVENTOR
John Thompson Lovett, Jr.
BY
ATTORNEY Patented July 3, 1934

1,964,887

UNITED STATES PATENT OFFICE 1,964,887

RESILIENT SEAL PLANT BALL PACKAGE

John Thompson Lovett, Jr., Little Silver, N. J.

Application August 27, 1932, Serial No. 630,687

10 Claims. (Cl. 47—37)

This invention relates to plant balls and methods of making the same.

One object of this invention is to provide a plant ball of simple and improved moisture retaining construction.

Another object of the invention is to furnish a device of the nature set forth which shall be reliable, inexpensive, safe and convenient to handle, and durable and efficient in use.

Another object of the invention is the provision of an improved method of making the same, such that the moisture retaining qualities thereof are improved.

Other objects and advantages of the invention will become apparent as the specification proceeds.

With the aforesaid and other objects in view the invention consists in the novel combination and arrangements of parts hereinafter described in their preferred embodiments, pointed out in the subjoined claims, and illustrated on the annexed drawing, wherein like parts are designated by the same reference characters throughout the several views.

In the drawing:

Figure 1 is a view in side elevation of a plant ball embodying the invention.

Fig. 2 is an enlarged view thereof in vertical section.

Fig. 3 is a sectional view thereof taken on line 3—3 of Fig. 2.

Fig. 4 is a fragmentary vertical sectional view of a modification of the invention.

Fig. 5 is a cross sectional view of a portion of the coating.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

This invention provides a plant ball package having a continuous waterproof coating engaged in an improved manner around the stem of the plant. Waterproof containers for diminishing loss of moisture by evaporation from a plant ball are known, but no device has been provided which shall fully retain such moisture and which shall function with uniform efficiency when made according to quantity production. Plant balls of the nature to which this invention relates must generally be maintained for a long time, as in storage, without requiring that water be added thereto. There is naturally some loss of moisture through the plant itself, but the main region of moisture loss is directly about the stem of the plant. Thus while the container may otherwise be quite moisture tight, the irregularities in the surface of the plant stem have rendered it quite difficult or impossible to afford a tight seal therearound, particularly where the seal was to be applied to or used in connection with a flexible or pliable covering, such as a waterproof paper bag, whose mouth is to be compressed around the plant stem. I have in actual practise found that a seal of a resilient, highly pliable material, such as batter cotton, which is not easily wetted, is well suited to the purpose, and said cotton may have been waterproofed or treated to render the same hygroscopic and thus further to avoid loss of moisture by evaporation. Batter cotton has the further advantage that is is a fluffy, dry, natural and hence inexpensive material, having fine intertwining strands producing a compact pliable and resilient mass well adapted to hug the irregularities of the plant stem and of a pliable container and being non porous to liquids and well adapted to prevent loss of moisture by evaporation.

It is also known to immerse a plant ball in molten asphalt to afford a continuous coating therearound. This coating, however, is frequently full of small openings caused by projecting parts of the plant ball or by failure of the asphalt to adhere at certain points. By my invention, on the other hand, a fully closed and imperforate package is quickly and inexpensively produced.

The invention has the further object of waterproofing the stem of a plant in such a manner as not to harm the plant nor to diminish the attractiveness thereof. In this regard it has been known to immerse a plant in a viscous liquid such as wax, but this completely closes the openings in the stem of the plant and hence militates against the life thereof. But the coating which I provide only partially closes these openings and thus sufficiently restricts for all practical purposes the loss of moisture therethrough. Moreover, while a wax coating mars the appearance of the plant, the thin transparent coating which I use merely adds a glossy surface thereto.

Referring in detail to the drawing, 10 denotes a plant ball embodying the invention. The same may include the stem 11 and roots 12 of a plant and a mass of earth, peat or humus, or a mixture of any of these, in which the roots are packed. Preferably a material such as peat or humus is used since the same are well retentive of moisture and are light in weight. Enclosing the plant ball is a coating 14 which may consist of any suitable material and may be formed by dipping in a self hardening material or by applying a covering of paper, metal foil, or composition sheet material of a pliable nature. In any case, the coating is preferably water tight in character, and if made of paper, may include a waxed or otherwise treated paper, or one having a lining of asphalt. Thus the coating may have a plurality of paper layers 15 and a layer of asphalt 16 therebetween. Suitably waterproofed fabrics may also be employed.

Around the plant stem is formed a resilient or highly pliable seal 17 located near the mouth 18 of the bag 14. Said seal may be of highly yielding character, and can consist of any suitable material for that purpose. Thus cotton, wool, felt, rubber or even a highly viscous material may be used. The seal may be applied in any feasible manner, as by winding a strip of cotton or other woven or raw material about the stem to form layers 17a. Cotton has the advantage that it does not wet easily, and may be closely compressed into uniform contact with the plant stem, and is quite resilient. If the seal be made of sufficient depth, evaporation therethrough will be effectively prevented. The bag may be crimped as at 19 to embrace the seal, and a tension element such as a cord 20 may be drawn tightly around the mouth portion of the bag and against the seal, and knotted at 21.

If desired, the seal may be treated with a waterproofing material, such as wax, or it may be impregnated with a hygroscopic or deliquescent material such as glycerine. The glycerine may have its full content of water, so as not to absorb moisture from the plant ball. The fibrous character of the plant ball will tend to draw water therefrom by capillary action, if the moisture content of the plant ball be for any reason diminished. The hygroscopic material may also be applied to any other part of the container or directly to the plant ball, and even to the stem. Other hygroscopic materials are calcium and ammonium nitrate, and even cotton and wool are to some degree hygroscopic.

The seal may be applied or packed into containers of rigid as well as of pliable nature, and of any required size or shape.

The method of making the plant ball package will now be described. The plant ball may be placed in the bag 14, and then the cotton material wound around the stem. Then the mouth of the bag is compressed around the seal, and a cord 20 placed tightly therearound and knotted. The cotton fills into any irregularities in the stem and bag to afford a tight seal, without damage to the plant. This method can be quickly and inexpensively practised as both the cotton and the pliable bag are cheap and easy to handle.

It will be appreciated that by impregnating the seal with a thin liquid such as glycerine, which is very slow to evaporate, this seal may be made perfectly airtight, without any possibility of leakage between the pieces or layers of the cotton seal. The effectiveness of the seal is further increased by the hygroscopic action of the glycerine, whereby a small amount of glycerine can be used and yet sufficient liquid assured around the seal to practically eliminate loss of moisture from the plant ball, as I have found upon actual test.

I may also immerse the entire plant in glycerine or in a mixture of glycerine and water, preferably with the exception of the roots, which I may keep out of contact with any glycerine. I have found that one, and in some cases, two coatings of the glycerine or mixture thereof are highly satisfactory. This coating retains moisture and appears to slowly dry up, being in a very thin film, but leaves a very thin glossy transparent coating or deposit on the plant stem which partially closes the openings in the same and thus retards the loss of moisture from the plant ball through the stem, without, however, injuring the plant. I may use a mixture of equal parts of glycerine and water for impregnating the seal and for coating the plant stem, but other proportions with a substantially greater and lesser amount of glycerine can also be used. If the seal be of a comparatively easily wettable character, the glycerine or mixture may be applied to the plant stem so as to drip down upon the seal and impregnate the same. It is desired to indicate, that glycerine is mentioned as representative of other liquids which can be used for the purposes described.

In Fig. 4 is shown a modified seal for a plant ball, the same including a pliable container or bag 22 as hereinbefore described. A yielding seal 17 and compressing element 20 may be afforded in the mouth portion 23 of the bag at a suitable distance below the opening thereof. Above the seal 17, a supplemental seal 24 of any viscous material such as wax may be provided in the mouth portion, the edge of the latter being outwardly folded at 25 and drawn tight as by a cord 26.

The method of making the device will now be described. After the seal 17 is formed as hereinbefore described, the edge portion of the mouth 23 is outwardly folded at 25, and drawn partially together by the cord 26. Thus a space and opening is afforded through which the viscous material may be poured in place, so as to seal itself with the stem and bag, and to enter the folds in the bag due to crimping the mouth of the same together.

The bag may be of any desired shape. The seal 17 may cause retention of the material 24 before the same has set. The members 17 and 24 may conjointly form a tight seal and afford a handle portion for safely carrying the package.

It will be appreciated that various changes and modifications may be made in the device as shown in the drawing, and that the same is submitted in an illustrative and not in a limiting sense, the scope of the invention being defined in the following claims.

I claim:

1. A device including a plant ball having a stem, a seal of cotton extending closely around the stem portion, a pliable waterproof container enclosing the plant ball and extending around said seal, and means securing said container tightly around said seal.

2. A device including a plant ball, a container for receiving the plant ball and having an opening through which the stem projects, and a seal of resilient material extending around said stem in contact therewith and in continuous engagement with the container to close said opening, and said seal being compressed in said opening, and said seal being impregnated with a hygroscopic material.

3. A seal for a plant ball package, said seal consisting of a porous material treated with a hygroscopic material.

4. A plant ball container having a seal adapted to snugly embrace the stem of the plant ball and being impregnated with a hygroscopic material.

5. A device including a plant ball, a pliable moisture proof container therefor, a pliable seal for the container surrounding the stem of the plant ball, and a secondary seal of self hardening material for the container surrounding the stem and resting on the first mentioned seal, and a coating of hygroscopic material on the plant stem extending to the secondary seal.

6. The method of making a plant ball package which includes treating a seal therefor with a hygroscopic material.

7. The method of maintaining a plant which includes forming the roots thereof in a plant ball having a moisture proof coating and a porous seal therefor around the plant stem, and coating the plant stem and impregnating said seal with a hygroscopic material.

8. A plant ball package including a pliable container having an opening for the stem of the plant, a yielding porous seal snugly engaged in said opening extending around the plant stem, and a hygroscopic filler material in said seal.

9. A plant ball package including a mass of humus packed around the roots of the plant, a pliable container for the said mass, said container being moisture proof to conserve the moisture of the humus, a seal for said container, and a hygroscopic material incorporated in the seal and coacting with the humus.

10. A device including a plant ball having a stem, a relatively water dry seal of a fluffy material having uniformly fine intertwining strands producing a compact, pliable and resilient mass and the latter being non porous to water, a pliable waterproof container enclosing the plant ball and extending around the seal, and means securing the container tightly around the seal, with the seal substantially preventing loss of moisture by evaporation therethrough.

JOHN THOMPSON LOVETT, Jr.